(12) United States Patent
Kawaura (10) Patent No.: US 6,886,069 B2
(45) Date of Patent: Apr. 26, 2005

(54) IC CARD AND MANAGEMENT METHOD OF NONVOLATILE MEMORY IN IC CARD

(75) Inventor: Atsuyoshi Kawaura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 10/157,017

(22) Filed: May 30, 2002

(65) Prior Publication Data

US 2002/0184434 A1 Dec. 5, 2002

Related U.S. Application Data

(63) Continuation of application No. PCT/JP99/06698, filed on Nov. 30, 1999.

(51) Int. Cl.[7] .............................................. G06F 12/00
(52) U.S. Cl. ........................ 711/102; 711/1; 711/101; 711/103; 711/132; 711/133; 711/154; 711/159; 711/170; 711/221; 707/206; 705/41; 235/380
(58) Field of Search ................................ 711/102, 101, 711/103, 1, 132, 133, 154, 159, 170, 221; 707/206; 705/41; 235/380

(56) References Cited

U.S. PATENT DOCUMENTS 6,128,627 A * 10/2000 Mattis et al. ............... 707/202
6,484,247 B1 * 11/2002 Gendron et al. ............ 711/170
6,488,211 B1 * 12/2002 Everett et al. .............. 235/492
6,575,372 B1 * 6/2003 Everett et al. .............. 235/492

FOREIGN PATENT DOCUMENTS

EP 955 577 11/1999 ............. G06F/9/00
EP 1239411 A1 * 9/2002 ......... G06K/19/073
WO WO 98/52152 11/1998
WO WO 99/40548 8/1999

OTHER PUBLICATIONS

Garthwaite et al., "Transactions for Java," pp. 1–9, Computer and Information Science Department, University of Pennsylvania, Sep. 1996.*

Ungar, "Generation Scavenging: A Non–Disruptive High Performance Storage Reclamation Algorithm," pp. 157–167, ACM 1984.*

Agesen et al., "Finding References in Java Stacks," pp. 1–7, ACM, Aug. 1997.*

International Search Report for PCT/JP99/06698 dated Feb. 1, 2000.*

"Java for Smart Card," Java World, vol. 2, No. 7 (Jul. 1, 1998), pp. 154–160, in original Japanese language with statement of relevance.

Sun Microsystems, Inc, " Java Card Applet Developer' s Guide", revision 1.12, Aug. 19, 1998, Chapter 1, 4.

* cited by examiner

Primary Examiner—Stephen Elmore
(74) Attorney, Agent, or Firm—Pillsbury Winthrop LLP (57) ABSTRACT

An IC card having nonvolatile and volatile memory is disclosed. An IC card generates a volatile object, and accesses the volatile object using a reference address on a nonvolatile memory. These volatile objects are dynamically generated. The objects are allocated addresses in order from volatile objects with shorter terms to volatile objects with longer terms, so as to allow garbage collection and reuse of a volatile memory.

2 Claims, 7 Drawing Sheets

IC CARD AND MANAGEMENT METHOD OF NONVOLATILE MEMORY IN IC CARD

CROSS-REFERENCE TO RELATED APPLICATIONS

This is a Continuation Application of PCT Application No. PCT/JP99/06698, filed Nov. 30, 1999, which was not published under PCT Article 21(2) in English.

BACKGROUND OF THE INVENTION

1. Field of the Invention

The present invention relates to an IC card which has nonvolatile and volatile memories, and executes processes in accordance with an externally installed application, and a management method of a volatile memory in the IC card.

2. Description of the Related Art

In recent years, an environment (Java) used to execute a program on a network such as the Internet or the like has appeared, and is becoming increasingly prevalent along with the current Internet boom. Hence, an IC card that incorporates such an environment is developed.

In Java, an application (called an "applet") created using the Java language runs on any device having a Java API (Application Interface), i.e., runs independently of the type of device (e.g., a personal computer, portable terminal, and the like) as long as it has a Java API. Only a required Java applet can be downloaded from the network and can be used when it is necessary.

For this reason, an IC card (Java card) to which the aforementioned merits of Java are applied by installing an application developed using the Java language in the IC card has been proposed.

For example, an application for a credit card and that for a debit card are installed to provide an IC card that can implement these two functions.

In such IC card, initialization data for respective applications are downloaded and stored in a nonvolatile memory, and an area for storing objects and the like generated upon processing of the application is prepared for each application.

In this case, nonvolatile and volatile objects are generated. A nonvolatile object is stored in an area prepared in the nonvolatile memory, and a volatile object is stored in an area prepared in a volatile memory. Also, stack data such as a confirmation code or the like, which can be deleted upon power OFF, is stored in the volatile memory.

However, in this arrangement, it is impossible to choose the address of the volatile memory where the volatile object is to be stored. Also, it is desirable that the application not manage the storage location of a volatile object.

In the IC card, the volatile memory is used as a work area for internal control. In such conventional IC cards, a volatile object is assigned from the highest address in the stack growth direction, and a stack is assigned from the lowest address of the volatile memory.

However, in the IC card in which an application is installed, as described above, it is desired to generate volatile objects upon running the application. Such dynamic volatile objects are assigned to an area higher than the stack in the volatile memory.

However, if a volatile memory is used like this stack growth may encroach on the volatile objects. To avoid such encroachment, a method of using a stack after it is inspected if stack growth is possible may be used. However, such a method is inefficient, and the stack use size of each process must be detected in advance.

The stack consumption size of each application process is not limited to that process, but often depends on its process history. In this manner, the maximum stack use size can be detected, but it is very difficult to obtain a stack use size in the current process.

It is an object of the present invention to provide an IC card which has nonvolatile and volatile memories, executes a process by an externally installed application, stores a nonvolatile object generated by the application in the nonvolatile memory, and stores a volatile object generated by the application in the volatile memory, wherein access can be made independently of whether an object generated and stored by the application is volatile or nonvolatile.

It is another object of the present invention to effectively use a volatile memory.

It is a further object of the present invention to attain a simple, high-speed process.

According to the present invention, in an IC card which has a nonvolatile memory for storing nonvolatile data and a volatile memory for storing volatile data, and executes a process by an externally installed application, the application is stored in the nonvolatile memory, nonvolatile data generated by the application is stored in the nonvolatile memory, volatile data associated with the nonvolatile data generated by the application is stored in the volatile memory, a storage address of the nonvolatile memory corresponding to the nonvolatile data, and a storage address of the volatile memory corresponding to the volatile data associated with that nonvolatile data are stored in a management table in correspondence with each other, when a storage address of the nonvolatile memory is designated by the application, nonvolatile data at the storage address of the nonvolatile memory is accessed, and the storage address of the volatile memory corresponding to this storage address of the nonvolatile memory is read out from the management table to access volatile data at the storage address of the volatile memory.

According to the present invention, in an IC card which has a volatile memory that stores nonvolatile objects and stack data as volatile data, and executes a process by an externally installed application, volatile objects generated by the application are stored in turn from lower addresses of the volatile memory, and stack data generated by the application is sequentially stored from the highest address of the volatile object in the volatile memory in a higher address direction.

According to the present invention, an IC card in which install data of an externally supplied application is installed, and which executes a process by the installed application, comprises a non-rewritable first nonvolatile storage unit for storing a basic program, a rewritable second nonvolatile storage unit for storing various applications, and storing nonvolatile data generated by the application, a volatile storage unit for storing volatile data generated by the application, execution means for executing a process on the basis of an application read out from the second nonvolatile storage unit in an operation environment defined by the basic program in the first nonvolatile storage unit, and a management table which stores a storage address of nonvolatile data in the second nonvolatile storage unit and a storage address of the volatile storage unit corresponding to volatile data associated with this nonvolatile data in correspondence with each other.

BRIEF SUMMARY OF THE INVENTION

An IC card of the present invention allows an application to generate a volatile object, and can access a volatile object in a volatile memory using a reference address in a nonvolatile memory.

Also, in a management method of a volatile memory in an IC card of the present invention, since volatile objects are always allocated at addresses lower than a stack base in the stack growth direction, stack growth never encroaches the volatile objects.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the accompanying drawings.

Figure 1:
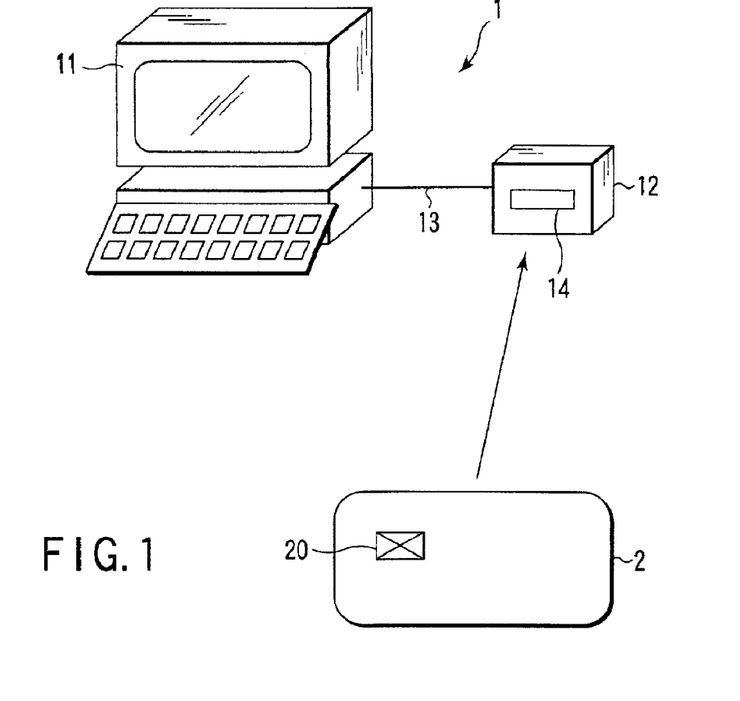
FIG. 1 is a schematic view showing the arrangement of an IC card processing system according to an embodiment of the present invention.

FIG. 1 shows a schematic arrangement of an IC card processing system according to the present invention.

This IC card processing system comprises a terminal 1 and IC card (Java Card) 2. In the terminal 1, an arithmetic device 11 that controls arithmetic operations and inputs from an operator and a reader/writer 12 for controlling inputs/outputs from/to the IC card 2 are connected via a cable 13.

The arithmetic device 11 has a processor for making arithmetic operations, and also an input means from an external system including an operator. The arithmetic device 11 issues a request to the IC card 2, and processes result status data.

The reader/writer 12 receives a request from the arithmetic device 11, and issues that request to the IC card 2 inserted in a card insert port 14. Likewise, the reader/writer 12 receives status data from the IC card 2, and reports that result to the arithmetic device 11.

Figure 2:
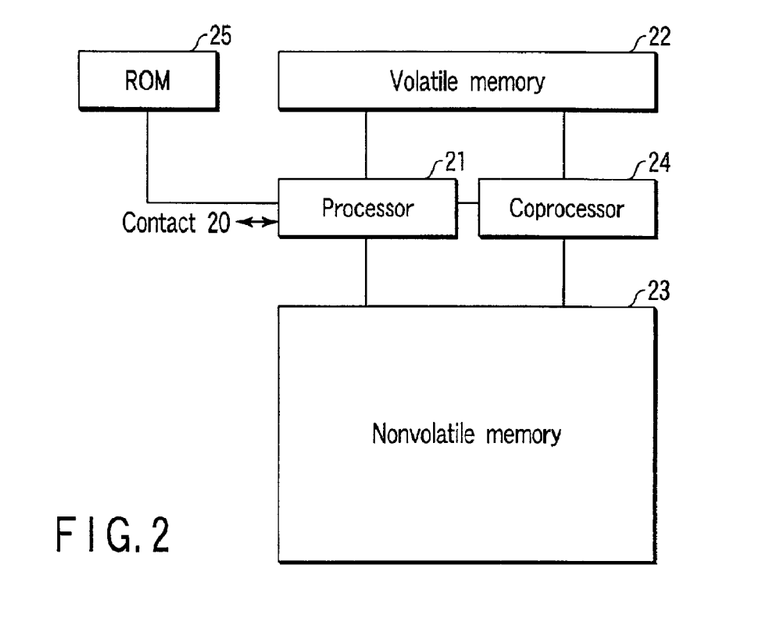
FIG. 2 is a schematic block diagram showing the arrangement of an IC card shown in FIG. 1.

As shown in FIGS. 1 and 2, the IC card 2 has a contact 20 serving as a contact with an external system, a processor 21 for making arithmetic operations and control, a volatile memory (RAM) 22 which stores temporary data, and is used as an area required for transient data and execution of a program, a nonvolatile memory (EEPROM) 23 for saving a rewritable program code, an install program code for the Java card, and rewritable data with a permanent attribute, a coprocessor 24 that assists the processor 21, and a ROM 25 which stores non-rewritable program codes (card operating system (COS) and a program for loading/installing an application) which incorporate a virtual machine for interpreting card domains and byte codes of an application, and data which are not rewritten. The IC card 2 communicates with the reader/writer 12 via the contact 20. As the nonvolatile memory 23, a flash memory, FRAM, or the like may be used.

The two types of memories, i.e., the volatile memory 22 and nonvolatile memory 23, are managed under the control of the processor 21. The IC card may have the coprocessor 24 for especially making arithmetic operations that produce loads, and the coprocessor 24 makes arithmetic operations in accordance with an instruction from the processor 21.

Data is input from the contact 20 in FIG. 1, and is stored in a communication buffer normally included in the volatile memory 22. The stored data is interpreted and processed by the processor 21. Data which must be saved is written in a permanent data area of the nonvolatile memory 23 in accordance with an instruction of the processor 21. Also, for data that requires a special arithmetic operation, a processing instruction is sent to the coprocessor 24.

Large amounts of data or the like which cannot be stored in the volatile memory 22 is temporarily written in a work area of the nonvolatile memory 23. Note that the distinction between the permanent data area and work area is not absolutely necessary.

Figure 3:
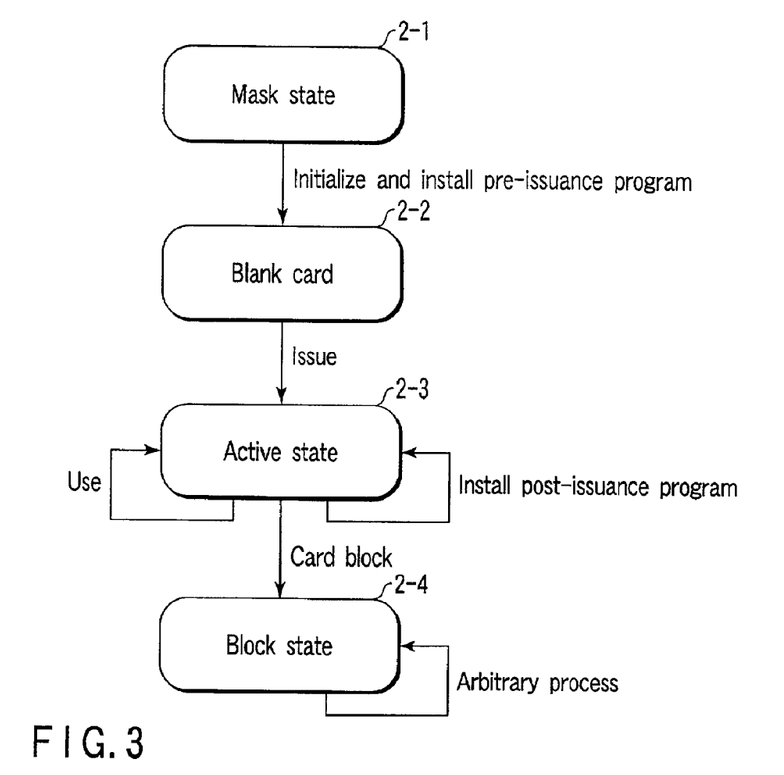
FIG. 3 is a chart for explaining the life cycle of a Java card (IC card) shown in FIG. 1.

FIG. 3 simply shows the life cycle of the Java Card (IC card 2). Note that state names and transition contents are different from actual names and the like, since expressions which are easy to understand are used for the sake of simplicity.

State 2-1 is a state of the Java Card immediately after manufacture. By executing various initialization processes and installing a pre-issuance (Java) program in this state, a blank card (2-2) is obtained. The blank card undergoes an issuance process for writing information unique to a card holder and information unique to the pre-issuance (Java) program, thus obtaining a card in an active state (usable state, 2-3).

If that card undergoes a card block process, a card in a block state (2-4) which can never be used is obtained. As a feature of the Java card, by installing a post-issuance (Java) program in the card in the active state (2-3), a program can be added after issuance.

Figure 4:
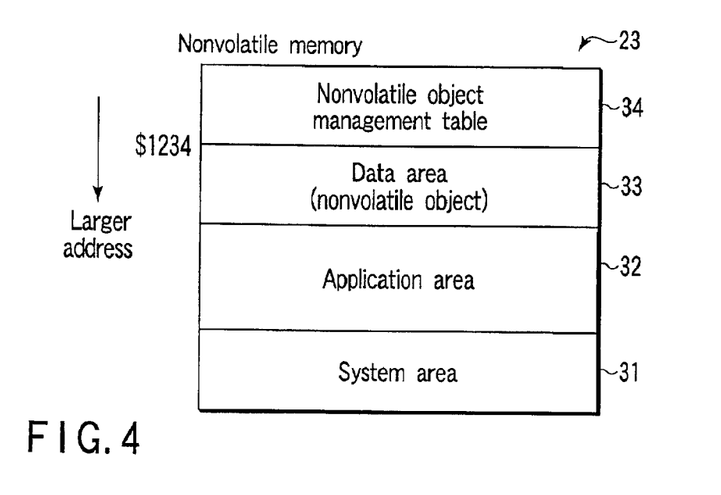
FIG. 4 shows an example of the configuration of a nonvolatile memory shown in FIG. 2.

The nonvolatile memory 23 is assigned a system area 31, application area 32, data area 33, and nonvolatile object management table 34 from the last address in the direction of smaller addresses, as shown in FIG. 4.

The system area 31 is an area that stores data required for the system. The application area (area which is used permanently) 32 is an area in which applications as a plurality of Java programs are installed. The data area 33 is an area which serves as a work area that stores nonvolatile objects and the like as nonvolatile data upon execution of each application. The nonvolatile object management table 34 is an area for managing the addresses of nonvolatile objects in the data area 33.

Figure 5:
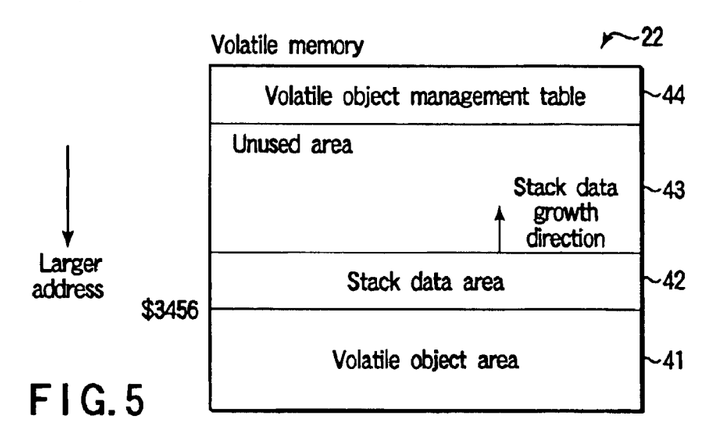
FIG. 5 shows an example of the configuration of a volatile memory shown in FIG. 2.

The volatile memory 22 is assigned a volatile object area 41, stack data area 42, unused area 43, and volatile object management table 44 from the last address in the direction of smaller addresses, as shown in FIG. 5.

The volatile object area 41 is an area for storing a volatile object as the first volatile data. The stack data area 42 is an area for storing a data group that must be reserved during processing of an application, i.e., stack data such as a confirmation code and the like, which can be deleted upon power OFF. The unused area 43 is an area which is not used. The volatile object management table 44 is an area for managing the addresses of volatile objects.

The method of using the volatile memory 22 will be explained below. As shown in FIG. 5, when the growth process of volatile objects ends, and only stack data increases, the volatile objects are located at addresses that are larger than the addresses of the stack data, and growth of stack data is limited to the smaller address direction (i.e., upward, as shown in FIG. 5) of the volatile memory 22. For this reason, growth of stack data never encroaches the volatile objects.

When the IC card processing apparatus further comprises an address monitoring device, a hardware interrupt may be generated when growth of stack data has reached the volatile object management table 44 as a write-inhibited area. In this case, a stack overflow can be detected without checking by software.

Figure 6:
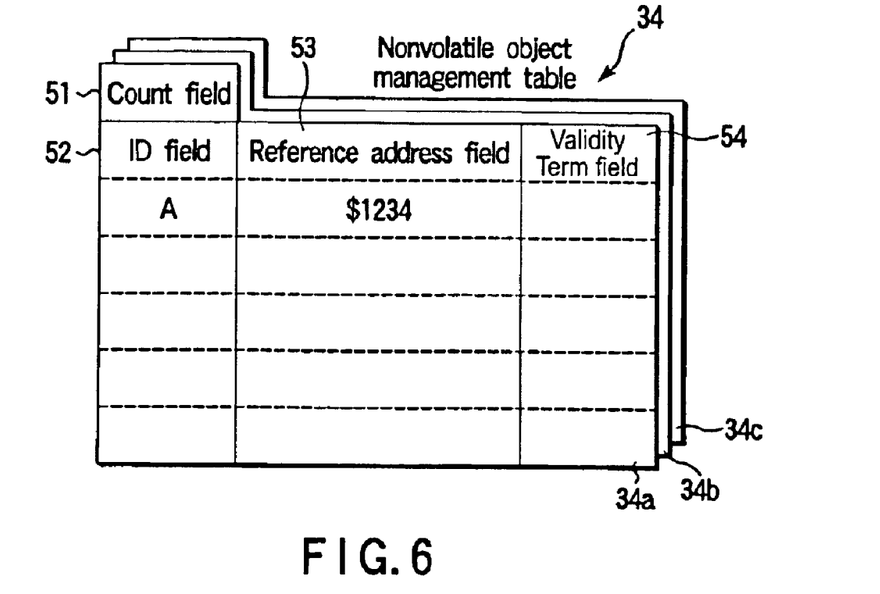
FIG. 6 shows an example of the configuration of a nonvolatile object management table shown in FIG. 4.

The nonvolatile object management table 34 is made up of tables 34a, 34b, and 34c corresponding to applications, as shown in FIG. 6. Each table 34a, 34b, and 34c has a count field 51 for storing the number of nonvolatile objects, an ID field 52 for storing the IDs of the nonvolatile objects corresponding to that number, a reference address field 53 for storing the storage addresses of the nonvolatile objects in the data area 33 as reference addresses corresponding to these IDs, and a term field 54 for storing the validity terms (e.g.,time to keep volatile object in memory) of volatile objects corresponding to the IDs.

Figure 7:
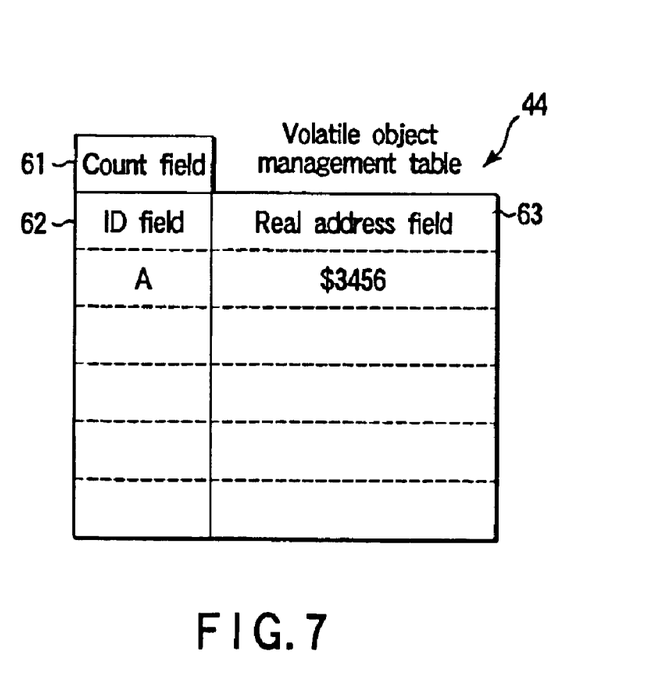
FIG. 7 shows an example of the configuration of a volatile object management table shown in FIG. 5.

The volatile object management table 44 has a count field 61 for storing the number of volatile objects, an ID field 62 for storing the IDs of volatile objects corresponding to that number, and a real address field 63 for storing the storage addresses of volatile objects in the volatile memory 22 as real addresses corresponding to these IDs, as shown in FIG. 7.

Volatile and nonvolatile objects obtain actual addresses as the sums of the start address and offsets from that address. Each object is a nonvolatile object as a default, and becomes a volatile object by making library call using the reference to that object as an argument.

Figure 8:
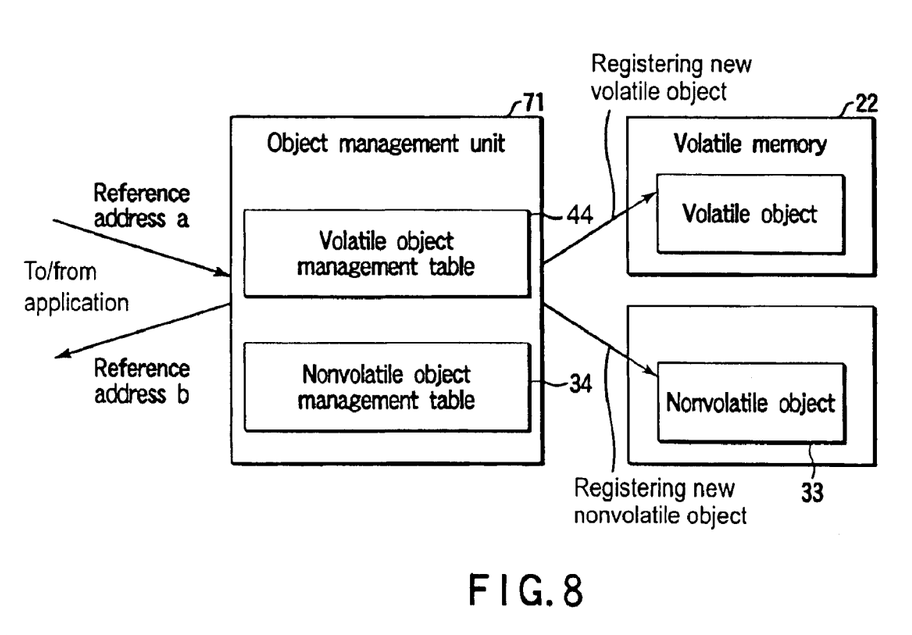
FIG. 8 is a diagram for explaining the relationship between an object management unit and the nonvolatile memory of the volatile memory.

The IC card 2 has an object management unit 71 for managing volatile objects in the volatile memory 22 and nonvolatile objects in the data area 33 of the nonvolatile memory 23 using the nonvolatile object management table 34 and volatile object management table 44, as shown in FIG. 8.

Upon receiving reference address a called from an application, the object management unit 71 searches the nonvolatile object management table 34a corresponding to that application for a reference address (for example, $1234 shown in FIGS. 4 and 6) which matches reference address a, extracts an ID (for example, "A" shown in FIG. 6) corresponding to that matched reference address, and searches for an ID (for example. "A" shown in FIG. 7) that matches the volatile object management table 44 based on the extracted ID.

If the ID that matches the extracted ID is found as a result of the ID search, the object management unit 71 determines that a corresponding volatile object is detected, extracts a real address corresponding to the ID, and returns that real address (indicating a volatile object in the volatile memory 22 for example, $3456 shown in FIGS. 5 and 7) as reference address b to the application.

If no ID that matches the extracted ID is found as a result of the ID search, the object management unit 71 determines that no corresponding volatile object is detected, and returns input reference address a as reference address b. In this case, reference addresses a and b are the same address as the nonvolatile object on the nonvolatile memory 23.

Figure 9:
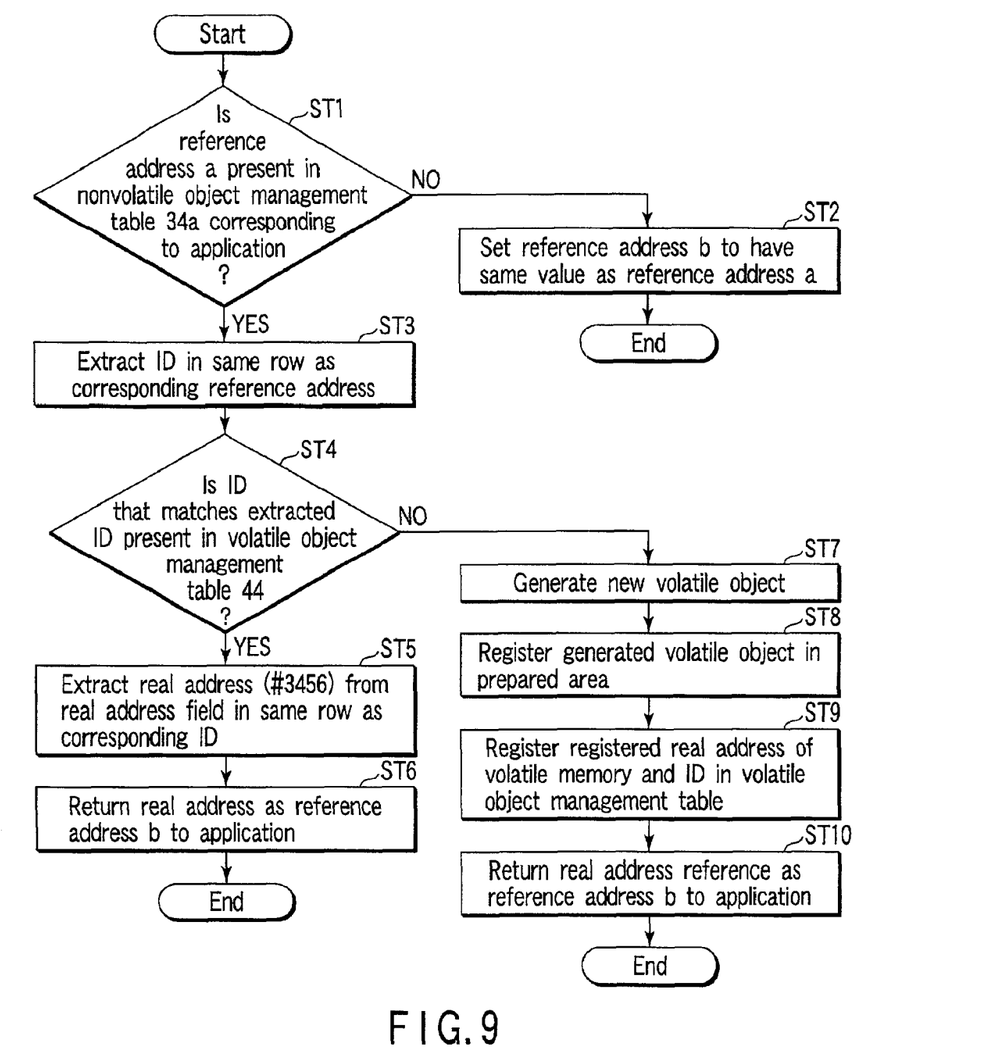
FIG. 9 is a flow chart for explaining an object management process.

The object management process carried out by the object management unit 71 in the above arrangement will be described below with reference to the flow chart shown in FIG. 9.

That is, the object management unit 71 receives reference address a called from an application, and scans, using the nonvolatile object management table 34a, to check whether a reference address, corresponding to that application, that matches reference address a is registered in the reference address area 53 (ST1).

As a result, if no corresponding reference address is registered, the object management unit 71 returns that reference address to the application without changing it (ST2).

As a result of the scan in step 1, if the corresponding address is registered, the object management unit 71 extracts an ID from the ID field 52 in the same row as the corresponding reference address (ST3).

The object management unit 71 scans if an ID that matches the extracted ID is registered in the ID field 62 of the volatile object management table 44 (ST4).

As a result, if the corresponding ID is registered, the object management unit 71 extracts a real address from the real address field 63 in the same row as the corresponding ID (ST5). In this manner, the object management unit 71 returns this real address as reference address b to the application (ST6).

As a result of the scan in step 4, if no corresponding ID is registered, the object management unit 71 generates a new volatile object (ST7), registers the generated volatile object in a prepared volatile object/unused area 45 (ST8), and registers the registered address in the volatile memory 22 as a real address in the volatile object management table 44 together with the ID (ST9). In this case, the ID is additionally registered to the ID field 62, and the real address is registered in the real address field 63 in the same row as that ID.

In this manner, the object management unit 71 returns the registered address as reference address b to the application (ST10).

In step 7, a new volatile object may be generated by the application.

Figure 10:
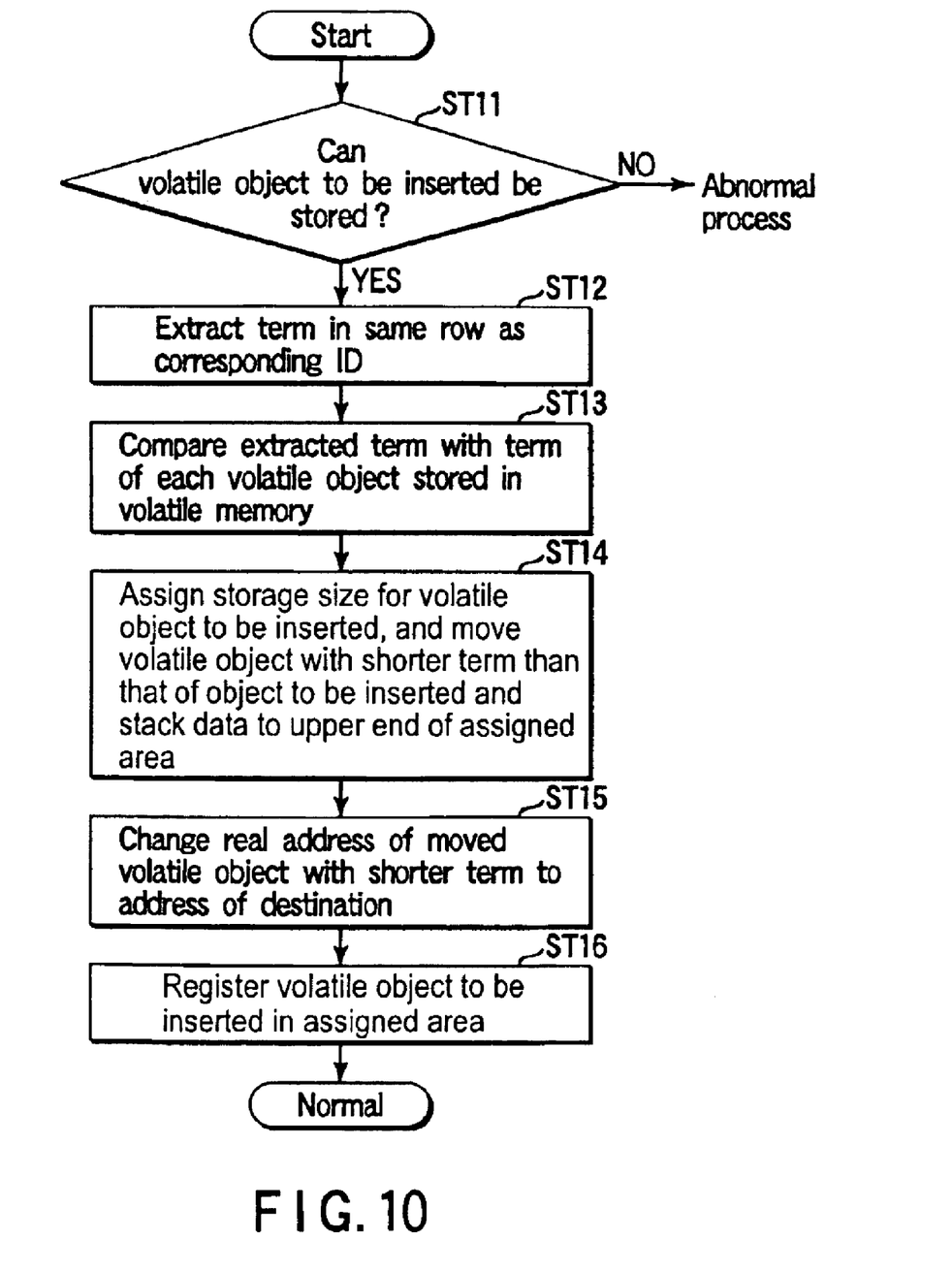
FIG. 10 is a flow chart for explaining a volatile object registration process in step 8 in FIG. 9.
Figure 11A:
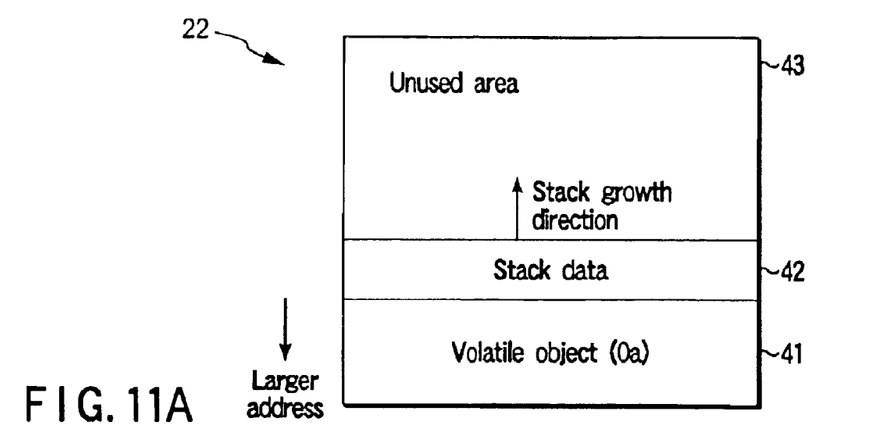
FIGS. 11A to 11C show the recording states of the volatile memory.
Figure 11B:
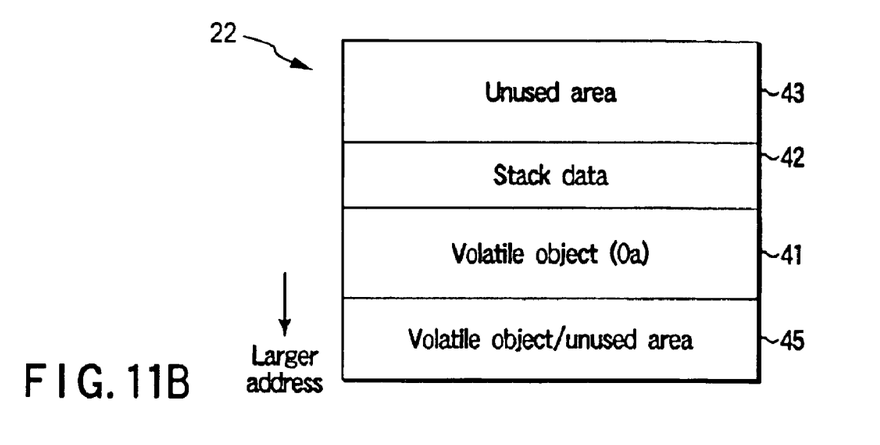

The registration process of a volatile object (Ob) in step 8 will be described below with reference to the flow chart shown in FIG. 10 and the recording states of the nonvolatile memory 22 shown in FIGS. 11A, 11B, and 11C.

That is, the object management unit 71 confirms, based on the size of the unused area 43 of the volatile memory 22, if the generated volatile object (Ob) can be inserted (ST11). As a result of this confirmation, if it is determined that the generated volatile object cannot be inserted, the object management unit 71 determines an abnormality, and informs the application of it.

As a result of the confirmation in step 11, if it is determined that the generated volatile object can be inserted, the object management unit 71 extracts a term from the term field 54 in the same row as the corresponding ID in the nonvolatile object management table 34*a* (ST12). The object management unit 71 compares the extracted term with those of respective volatile objects (Oa) stored in the volatile memory 22 (ST13). As a result of comparison, if a volatile object (Oa) with a shorter term than that of the object to be inserted is found, the object management unit 71 moves the stack data and the volatile object (Oa) with the shorter term to the upper end (smaller address) of a volatile object/unused area 45 assured for the storage size of the volatile object (Ob) to be inserted in the volatile memory 22, as shown in FIGS. 11A and 11B (ST14).

After this movement, the object management unit 71 changes the real address in the volatile object management table 44 corresponding to the volatile object (Oa) with the shorter term to that of the destination (ST15).

Figure 11C:
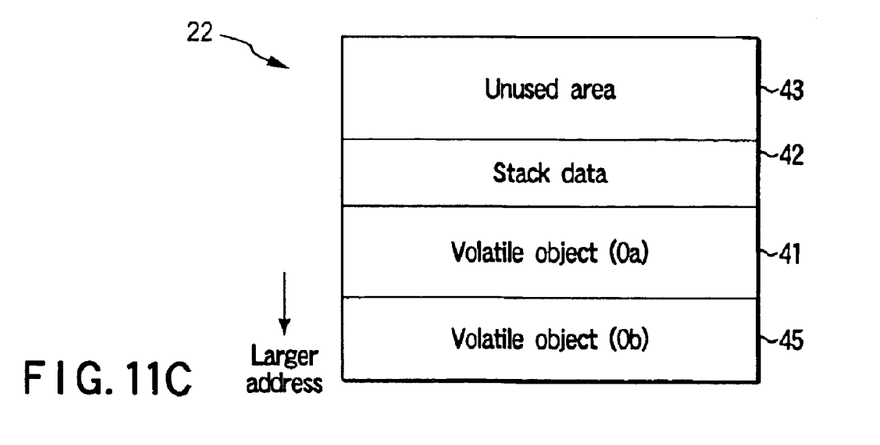

The object management unit 71 registers the volatile object (Ob) to be inserted in the volatile object/unused area 45 of the volatile memory 22 assured in step 14, as shown in FIG. 11C (ST16).

As a result, the insertion position of the volatile object in the volatile memory 22 is set so that the volatile object (Oa) with the shorter term always has a smaller address.

By adding this process, a volatile object, the validity of which has expired, can be easily deleted from the volatile memory 22, and garbage collection and reuse of the volatile memory 22 can be made.

As described above, according to the present invention, in an IC card which has nonvolatile and volatile memories, executes a process by an externally installed application, stores a nonvolatile object generated by the application in the nonvolatile memory, and stores a volatile object generated by the application in the volatile memory, access can be made independently of the type of object generated and stored by the application.

Further, the volatile memory can thus be used effectively.

Furthermore, a simple, high-speed process can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of managing a memory of an IC card which has a volatile memory for storing a nonvolatile object and stack data as volatile data, and executes a process by using an externally installed application, the method comprising:

storing volatile objects generated by the application in turn from larger addresses of the volatile memory; and sequentially storing stack data generated by the application, along a smaller address direction, from an address that is smaller than the smallest address of the volatile objects in the volatile memory.

2. A method of managing a memory of an IC card according to claim 1, wherein when volatile objects generated by the application are additionally stored in the volatile memory, the volatile objects are stored in an order such that the volatile objects having shorter validity terms correspondingly occupy smaller addresses in the volatile memory.

* * * * *